(12) United States Patent
Ross

(10) Patent No.: US 10,911,725 B2
(45) Date of Patent: Feb. 2, 2021

(54) SYSTEM FOR AUTOMATICALLY TRIGGERING A RECORDING

(71) Applicant: Digital Ally, Inc., Lenexa, KS (US)

(72) Inventor: Stanton E. Ross, Overland Park, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 15/916,654

(22) Filed: Mar. 9, 2018

(65) Prior Publication Data

US 2018/0262724 A1    Sep. 13, 2018

Related U.S. Application Data

(60) Provisional application No. 62/469,241, filed on Mar. 9, 2017.

(51) Int. Cl.
*H04N 7/18* (2006.01)
*G06K 9/00* (2006.01)

(52) U.S. Cl.
CPC ......... *H04N 7/188* (2013.01); *G06K 9/00711* (2013.01); *H04N 7/183* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 4,409,670 A | 10/1983 | Herndon et al. |
| 4,789,904 A | 12/1988 | Peterson |
| 4,863,130 A | 9/1989 | Marks, Jr. |
| 4,918,473 A | 4/1990 | Blackshear |
| 5,027,104 A | 6/1991 | Reid |
| 5,096,287 A | 3/1992 | Kaikinami et al. |
| 5,111,289 A | 5/1992 | Lucas et al. |
| 5,289,321 A | 2/1994 | Secor |
| 5,381,155 A | 1/1995 | Gerber |
| 5,408,330 A | 4/1995 | Squicciarii et al. |
| 5,446,659 A | 8/1995 | Yamawaki |
| 5,453,939 A | 9/1995 | Hoffman et al. |

(Continued)

FOREIGN PATENT DOCUMENTS

| | | |
|---|---|---|
| DE | 102010019451 A1 | 11/2011 |
| EP | 2479993 A2 | 7/2012 |

(Continued)

OTHER PUBLICATIONS

Automation Systems Article, Know-How Bank Co. Ltd. Takes Leap Forward as a Company Specializing in R&D and Technology Consulting, published Jan. 2005.

(Continued)

*Primary Examiner* — Fernando Alcon
(74) *Attorney, Agent, or Firm* — Erise IP, P.A.

(57) ABSTRACT

System, method, and media for providing automatic recording of an event. The event may be detected from a set of data collected at a sensor. A recording device manager may send signals to other sensors and electromechanical devices to activate these sensors and electromechanical devices based on detection of the triggering event. The sensor may collect data associated with the triggering event and the electromechanical devices may perform actions based on the triggering event.

16 Claims, 6 Drawing Sheets

(56) References Cited

U.S. PATENT DOCUMENTS

| | | |
|---|---|---|
| 5,473,729 A | 12/1995 | Bryant et al. |
| 5,479,149 A | 12/1995 | Pike |
| 5,497,419 A | 3/1996 | Hill |
| 5,526,133 A | 6/1996 | Paff |
| 5,585,798 A | 12/1996 | Yoshioka et al. |
| 5,642,285 A | 6/1997 | Woo et al. |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,962,806 A | 10/1999 | Coakley et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price R-W et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,141,611 A | 10/2000 | Mackey et al. |
| 6,163,338 A | 12/2000 | Johnson et al. |
| 6,175,300 B1 | 1/2001 | Kendrick |
| 6,298,290 B1 | 10/2001 | Abe et al. |
| 6,310,541 B1 | 10/2001 | Atkins |
| 6,314,364 B1 | 11/2001 | Nakamura |
| 6,324,053 B1 | 11/2001 | Kamijo |
| 6,326,900 B2 | 12/2001 | Deline et al. |
| 6,333,694 B2 | 12/2001 | Pierce et al. |
| 6,333,759 B1 | 12/2001 | Mazzilli |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,449,540 B1 | 9/2002 | Rayner |
| 6,452,572 B1 | 9/2002 | Fan et al. |
| 6,490,409 B1 | 12/2002 | Walker |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,563,532 B1 | 5/2003 | Strub et al. |
| 6,583,813 B1 * | 6/2003 | Enright .................. G06Q 20/18 348/143 |
| 6,591,242 B1 | 7/2003 | Karp et al. |
| 6,681,195 B1 | 1/2004 | Poland et al. |
| 6,690,268 B2 | 2/2004 | Schofield et al. |
| 6,697,103 B1 | 2/2004 | Fernandez et al. |
| 6,718,239 B2 | 4/2004 | Rayer |
| 6,727,816 B1 | 4/2004 | Helgeson |
| 6,747,687 B1 * | 6/2004 | Alves .................. H04N 7/188 340/932.2 |
| 6,748,792 B1 | 6/2004 | Freund et al. |
| 6,823,621 B2 | 11/2004 | Gotfried |
| 6,831,556 B1 | 12/2004 | Boykin |
| 6,856,873 B2 | 2/2005 | Breed et al. |
| 6,883,694 B2 | 4/2005 | Abelow |
| 6,970,183 B1 | 11/2005 | Monroe |
| 7,012,632 B2 | 3/2006 | Freeman et al. |
| 7,034,683 B2 | 4/2006 | Ghazarian |
| D520,738 S | 5/2006 | Tarantino |
| 7,038,590 B2 | 5/2006 | Hoffman et al. |
| 7,088,387 B1 | 8/2006 | Freeman et al. |
| 7,119,832 B2 | 10/2006 | Blanco et al. |
| 7,126,472 B2 | 10/2006 | Kraus et al. |
| 7,147,155 B2 | 12/2006 | Weekes |
| 7,180,407 B1 | 2/2007 | Guo et al. |
| 7,190,822 B2 | 3/2007 | Gammenthaler |
| 7,363,742 B2 | 4/2008 | Nerheim |
| 7,371,021 B2 | 5/2008 | Ross et al. |
| 7,421,024 B2 | 9/2008 | Castillo |
| 7,436,143 B2 | 10/2008 | Lakshmanan et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,496,140 B2 | 2/2009 | Winningstad et al. |
| 7,500,794 B1 | 3/2009 | Clark |
| 7,508,941 B1 | 3/2009 | O'Toole, Jr. et al. |
| 7,536,457 B2 | 5/2009 | Miller |
| 7,539,533 B2 | 5/2009 | Tran |
| 7,561,037 B1 | 7/2009 | Monroe |
| 7,594,305 B2 | 9/2009 | Moore |
| 7,602,301 B1 | 10/2009 | Stirling et al. |
| 7,656,439 B1 | 2/2010 | Manico et al. |
| 7,659,827 B2 | 2/2010 | Gunderson et al. |
| 7,680,947 B2 | 3/2010 | Nicholl et al. |
| 7,697,035 B1 | 4/2010 | Suber, III et al. |
| 7,804,426 B2 | 9/2010 | Etcheson |
| 7,806,525 B2 | 10/2010 | Howell et al. |
| 7,853,944 B2 | 12/2010 | Choe |
| 7,944,676 B2 | 5/2011 | Smith et al. |
| 8,077,029 B1 | 12/2011 | Daniel et al. |
| 8,121,306 B2 | 2/2012 | Cilia et al. |
| 8,175,314 B1 | 5/2012 | Webster |
| 8,269,617 B2 | 9/2012 | Cook et al. |
| 8,314,708 B2 | 11/2012 | Gunderson et al. |
| 8,350,907 B1 | 1/2013 | Blanco et al. |
| 8,356,438 B2 | 1/2013 | Brundula et al. |
| 8,373,567 B2 | 2/2013 | Denson |
| 8,373,797 B2 | 2/2013 | Ishii et al. |
| 8,384,539 B2 | 2/2013 | Denny et al. |
| 8,446,469 B2 | 5/2013 | Blanco et al. |
| 8,456,293 B1 | 6/2013 | Trundle et al. |
| 8,508,353 B2 | 8/2013 | Cook et al. |
| 8,594,485 B2 | 11/2013 | Brundula |
| 8,606,492 B1 | 12/2013 | Botnen |
| 8,676,428 B2 | 3/2014 | Richardson et al. |
| 8,690,365 B1 | 4/2014 | Williams |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,780,205 B2 | 7/2014 | Boutell et al. |
| 8,781,292 B1 | 7/2014 | Ross et al. |
| 8,805,431 B2 | 8/2014 | Vasavada et al. |
| 8,849,501 B2 | 9/2014 | Cook et al. |
| 8,854,199 B2 | 10/2014 | Cook et al. |
| 8,887,208 B1 | 11/2014 | Merrit et al. |
| 8,930,072 B1 | 1/2015 | Lambert et al. |
| 8,989,914 B1 | 3/2015 | Nemat-Nasser et al. |
| 8,996,234 B1 | 3/2015 | Tamari et al. |
| 9,003,474 B1 | 4/2015 | Smith |
| 9,058,499 B1 | 6/2015 | Smith |
| 9,122,082 B2 | 9/2015 | Abreau |
| 9,164,543 B2 | 10/2015 | Minn et al. |
| 9,253,452 B2 | 2/2016 | Ross et al. |
| 9,591,255 B2 | 3/2017 | Sakiewica et al. |
| 9,781,348 B1 * | 10/2017 | Bart .................. H04N 5/23296 |
| 2002/0013517 A1 | 1/2002 | West et al. |
| 2002/0019696 A1 | 2/2002 | Kruse |
| 2002/0032510 A1 | 3/2002 | Tumball et al. |
| 2002/0044065 A1 | 4/2002 | Quist et al. |
| 2002/0049881 A1 | 4/2002 | Sugimura |
| 2002/0084130 A1 | 7/2002 | Der Gazarian et al. |
| 2002/0131768 A1 | 9/2002 | Gammenthaler |
| 2002/0135336 A1 | 9/2002 | Zhou et al. |
| 2002/0159434 A1 | 10/2002 | Gosior et al. |
| 2002/0191952 A1 | 12/2002 | Fiore et al. |
| 2003/0040917 A1 | 2/2003 | Fiedler |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081934 A1 | 5/2003 | Kirmuss |
| 2003/0081935 A1 | 5/2003 | Kirmuss |
| 2003/0081942 A1 | 5/2003 | Melnyk et al. |
| 2003/0095688 A1 | 5/2003 | Kirmuss |

(56) References Cited

U.S. PATENT DOCUMENTS

| | | |
|---|---|---|
| 2003/0106917 A1 | 6/2003 | Shelter et al. |
| 2003/0133018 A1 | 7/2003 | Ziemkowski |
| 2003/0151510 A1 | 8/2003 | Quintana et al. |
| 2003/0184674 A1 | 10/2003 | Manico et al. |
| 2003/0185417 A1 | 10/2003 | Alattar et al. |
| 2003/0215010 A1 | 11/2003 | Kashiwa |
| 2003/0215114 A1 | 11/2003 | Kyle |
| 2003/0222982 A1 | 12/2003 | Hamdan et al. |
| 2004/0008255 A1 | 1/2004 | Lewellen |
| 2004/0043765 A1 | 3/2004 | Tolhurst |
| 2004/0119591 A1* | 6/2004 | Peeters ............... G08B 21/12 340/539.26 |
| 2004/0143373 A1 | 6/2004 | Ennis |
| 2004/0141059 A1* | 7/2004 | Enright ............... G06Q 20/18 348/150 |
| 2004/0145457 A1 | 7/2004 | Schofield et al. |
| 2004/0150717 A1 | 8/2004 | Page et al. |
| 2004/0168002 A1 | 8/2004 | Accarie et al. |
| 2004/0199785 A1 | 10/2004 | Pederson |
| 2004/0223054 A1 | 11/2004 | Rotholtz |
| 2004/0243734 A1 | 12/2004 | Kitagawa et al. |
| 2004/0267419 A1 | 12/2004 | Jing |
| 2005/0030151 A1 | 2/2005 | Singh |
| 2005/0046583 A1 | 3/2005 | Richards |
| 2005/0050266 A1 | 3/2005 | Haas et al. |
| 2005/0068169 A1 | 3/2005 | Copley et al. |
| 2005/0068417 A1 | 3/2005 | Kreiner et al. |
| 2005/0083404 A1 | 4/2005 | Pierce et al. |
| 2005/0094966 A1 | 5/2005 | Elberbaum |
| 2005/0100329 A1 | 5/2005 | Lao et al. |
| 2005/0101334 A1 | 5/2005 | Brown et al. |
| 2005/0134966 A1 | 5/2005 | Burgner |
| 2005/0132200 A1 | 6/2005 | Jaffe et al. |
| 2005/0151852 A1 | 7/2005 | Jomppanen |
| 2005/0035161 A1 | 8/2005 | Shioda |
| 2005/0168574 A1* | 8/2005 | Lipton ............... H04N 7/188 348/143 |
| 2005/0185438 A1 | 8/2005 | Ching |
| 2005/0206532 A1 | 9/2005 | Lock |
| 2005/0206741 A1 | 9/2005 | Raber |
| 2005/0228234 A1 | 10/2005 | Yang |
| 2005/0232469 A1 | 10/2005 | Schofield et al. |
| 2005/0243171 A1 | 11/2005 | Ross, Sr. et al. |
| 2005/0258942 A1 | 11/2005 | Manasseh et al. |
| 2006/0009238 A1 | 1/2006 | Stanco et al. |
| 2006/0028811 A1 | 2/2006 | Ross, Jr. et al. |
| 2006/0055786 A1 | 3/2006 | Olilla |
| 2006/0158968 A1 | 7/2006 | Vanman et al. |
| 2006/0164220 A1 | 7/2006 | Harter, Jr. et al. |
| 2006/0164534 A1 | 7/2006 | Robinson et al. |
| 2006/0170770 A1 | 8/2006 | MacCarthy |
| 2006/0176149 A1 | 8/2006 | Douglas |
| 2006/0183505 A1 | 8/2006 | Willrich |
| 2006/0193749 A1 | 8/2006 | Ghazarian et al. |
| 2006/0203090 A1 | 9/2006 | Wang et al. |
| 2006/0220826 A1 | 10/2006 | Rast |
| 2006/0225253 A1 | 10/2006 | Bates |
| 2006/0244601 A1 | 11/2006 | Nishimura |
| 2006/0256822 A1 | 11/2006 | Kwong et al. |
| 2006/0270465 A1 | 11/2006 | Lee et al. |
| 2006/0271287 A1 | 11/2006 | Gold et al. |
| 2006/0274166 A1 | 12/2006 | Lee et al. |
| 2006/0274828 A1 | 12/2006 | Siemens et al. |
| 2006/0276200 A1 | 12/2006 | Radhakrishnan et al. |
| 2006/0282021 A1 | 12/2006 | DeVaul et al. |
| 2006/0287821 A1 | 12/2006 | Lin |
| 2006/0293571 A1 | 12/2006 | Bao et al. |
| 2007/0021134 A1 | 1/2007 | Liou |
| 2007/0064108 A1 | 3/2007 | Haler |
| 2007/0067079 A1 | 3/2007 | Kosugi |
| 2007/0091557 A1 | 4/2007 | Kim et al. |
| 2007/0102508 A1 | 5/2007 | Mcintosh |
| 2007/0117083 A1 | 5/2007 | Winneg et al. |
| 2007/0132567 A1 | 6/2007 | Schofield et al. |
| 2007/0152811 A1 | 7/2007 | Anderson |
| 2007/0172053 A1 | 7/2007 | Poirier |
| 2007/0177023 A1 | 8/2007 | Beuhler et al. |
| 2007/0199076 A1 | 8/2007 | Rensin et al. |
| 2007/0229350 A1 | 10/2007 | Scalisi et al. |
| 2007/0257781 A1 | 11/2007 | Denson |
| 2007/0257782 A1 | 11/2007 | Etcheson |
| 2007/0257804 A1 | 11/2007 | Gunderson et al. |
| 2007/0257815 A1 | 11/2007 | Gunderson et al. |
| 2007/0260361 A1 | 11/2007 | Etcheson |
| 2007/0268158 A1 | 11/2007 | Gunderson et al. |
| 2007/0271105 A1 | 11/2007 | Gunderson et al. |
| 2007/0274705 A1* | 11/2007 | Kashiwa ............... H04N 5/232 396/310 |
| 2007/0277352 A1 | 12/2007 | Maron et al. |
| 2007/0285222 A1 | 12/2007 | Zadnikar |
| 2007/0287425 A1 | 12/2007 | Bates |
| 2007/0297320 A1 | 12/2007 | Brummette et al. |
| 2008/0001735 A1 | 1/2008 | Tran |
| 2008/0002031 A1 | 1/2008 | Cana et al. |
| 2008/0002599 A1 | 2/2008 | Denny et al. |
| 2008/0030580 A1 | 2/2008 | Kashhiawa et al. |
| 2008/0042825 A1 | 2/2008 | Denny et al. |
| 2008/0043736 A1 | 2/2008 | Stanley |
| 2008/0049830 A1 | 2/2008 | Richardson |
| 2008/0063252 A1 | 3/2008 | Dobbs et al. |
| 2008/0084473 A1 | 4/2008 | Romanowich |
| 2008/0100705 A1 | 5/2008 | Kister et al. |
| 2008/0101789 A1* | 5/2008 | Sharma ............... G03B 17/00 396/427 |
| 2008/0122603 A1 | 5/2008 | Piante et al. |
| 2008/0129518 A1 | 6/2008 | Carlton-Foss |
| 2008/0143481 A1 | 6/2008 | Abraham et al. |
| 2008/0144705 A1 | 6/2008 | Rackin et al. |
| 2008/0169929 A1 | 7/2008 | Albertson et al. |
| 2008/0170130 A1 | 7/2008 | Ollila et al. |
| 2008/0211906 A1 | 9/2008 | Lovric |
| 2008/0222849 A1 | 9/2008 | Lavoie |
| 2008/0239064 A1 | 10/2008 | Iwasaki |
| 2008/0246656 A1 | 10/2008 | Ghazarian |
| 2008/0266118 A1 | 10/2008 | Pierson et al. |
| 2008/0307435 A1 | 12/2008 | Rehman |
| 2008/0316314 A1 | 12/2008 | Bedell et al. |
| 2009/0002491 A1 | 1/2009 | Haler |
| 2009/0002556 A1 | 1/2009 | Manapragada et al. |
| 2009/0027499 A1 | 1/2009 | Nicholl |
| 2009/0052685 A1 | 2/2009 | Cilia et al. |
| 2009/0070820 A1 | 3/2009 | Li |
| 2009/0122142 A1 | 5/2009 | Shapley |
| 2009/0135007 A1 | 5/2009 | Donovan et al. |
| 2009/0169068 A1 | 7/2009 | Okamoto |
| 2009/0189981 A1 | 7/2009 | Siann et al. |
| 2009/0195686 A1 | 8/2009 | Shintani |
| 2009/0207252 A1 | 8/2009 | Raghunath |
| 2009/0213204 A1 | 8/2009 | Wong |
| 2009/0243794 A1 | 10/2009 | Morrow |
| 2009/0251545 A1 | 10/2009 | Shekarri et al. |
| 2009/0252486 A1 | 10/2009 | Ross, Jr. et al. |
| 2009/0276708 A1 | 11/2009 | Smith et al. |
| 2009/0294538 A1 | 12/2009 | Wihlborg et al. |
| 2009/0324203 A1 | 12/2009 | Wiklof |
| 2010/0045798 A1 | 2/2010 | Sugimoto et al. |
| 2010/0050734 A1 | 3/2010 | Chou |
| 2010/0060747 A1 | 3/2010 | Woodman |
| 2010/0097221 A1 | 4/2010 | Kriener et al. |
| 2010/0106707 A1 | 4/2010 | Brown et al. |
| 2010/0118147 A1 | 5/2010 | Dorneich et al. |
| 2010/0122435 A1 | 5/2010 | Markham |
| 2010/0123779 A1 | 5/2010 | Snyder et al. |
| 2010/0177193 A1 | 7/2010 | Flores |
| 2010/0177891 A1 | 7/2010 | Keidar et al. |
| 2010/0188201 A1 | 7/2010 | Cook et al. |
| 2010/0191411 A1 | 7/2010 | Cook et al. |
| 2010/0194885 A1 | 8/2010 | Plaster |
| 2010/0217836 A1 | 8/2010 | Rofougaran |
| 2010/0238009 A1 | 9/2010 | Cook et al. |
| 2010/0238262 A1 | 9/2010 | Kurtz et al. |
| 2010/0242076 A1 | 9/2010 | Potesta et al. |
| 2010/0265331 A1 | 10/2010 | Tanaka |
| 2010/0274816 A1 | 10/2010 | Guzik |

(56) References Cited

U.S. PATENT DOCUMENTS

| | | |
|---|---|---|
| 2010/0287473 A1 | 11/2010 | Recesso et al. |
| 2011/0006151 A1 | 1/2011 | Beard |
| 2011/0018998 A1 | 1/2011 | Guzik |
| 2011/0050904 A1 | 3/2011 | Anderson |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0098924 A1 | 4/2011 | Baladeta et al. |
| 2011/0129151 A1 | 6/2011 | Saito et al. |
| 2011/0261176 A1 | 10/2011 | Monaghan, Sr. et al. |
| 2011/0281547 A1 | 11/2011 | Cordero |
| 2011/0301971 A1 | 12/2011 | Roesch et al. |
| 2011/0314401 A1 | 12/2011 | Salisbury et al. |
| 2012/0038689 A1 | 2/2012 | Ishii |
| 2012/0056722 A1 | 3/2012 | Kawaguchi |
| 2012/0063736 A1 | 3/2012 | Simmons et al. |
| 2012/0120258 A1 | 5/2012 | Boutell et al. |
| 2012/0162436 A1 | 6/2012 | Cordell et al. |
| 2012/0188345 A1 | 7/2012 | Salow |
| 2012/0189286 A1 | 7/2012 | Takayama et al. |
| 2012/0195574 A1 | 8/2012 | Wallace |
| 2012/0230540 A1 | 9/2012 | Calman et al. |
| 2012/0257320 A1 | 10/2012 | Brundula et al. |
| 2012/0268259 A1 | 10/2012 | Igel et al. |
| 2012/0276954 A1 | 11/2012 | Kowalsky |
| 2013/0021153 A1 | 1/2013 | Keays |
| 2013/0033610 A1 | 2/2013 | Osborn |
| 2013/0035602 A1 | 2/2013 | Gemer |
| 2013/0080836 A1 | 3/2013 | Stergiou et al. |
| 2013/0096731 A1 | 4/2013 | Tamari et al. |
| 2013/0148295 A1 | 6/2013 | Minn et al. |
| 2013/0222640 A1 | 8/2013 | Baek et al. |
| 2013/0225309 A1 | 8/2013 | Bentley et al. |
| 2013/0285232 A1 | 10/2013 | Sheth |
| 2013/0300563 A1 | 11/2013 | Glaze |
| 2013/0343571 A1 | 12/2013 | Lee |
| 2014/0037262 A1 | 2/2014 | Sako |
| 2014/0049636 A1 | 2/2014 | O'Donnell et al. |
| 2014/0092299 A1 | 4/2014 | Phillips et al. |
| 2014/0094992 A1 | 4/2014 | Lambert et al. |
| 2014/0098453 A1 | 4/2014 | Brundula et al. |
| 2014/0140575 A1 | 5/2014 | Wolf |
| 2014/0170602 A1 | 6/2014 | Reed |
| 2014/0176733 A1* | 6/2014 | Drooker .............. G06Q 50/01 348/207.1 |
| 2014/0192194 A1 | 7/2014 | Bedell et al. |
| 2014/0195105 A1 | 7/2014 | Lambert et al. |
| 2014/0195272 A1 | 7/2014 | Sadiq et al. |
| 2014/0210625 A1 | 7/2014 | Nemat-Nasser |
| 2014/0218544 A1 | 8/2014 | Senot et al. |
| 2014/0227671 A1 | 8/2014 | Olmstead et al. |
| 2014/0311215 A1 | 10/2014 | Keays et al. |
| 2014/0355951 A1 | 12/2014 | Tabak |
| 2015/0050003 A1 | 2/2015 | Ross et al. |
| 2015/0050345 A1 | 2/2015 | Smyth et al. |
| 2015/0051502 A1 | 2/2015 | Ross |
| 2015/0053776 A1 | 3/2015 | Rose et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0163390 A1* | 6/2015 | Lee .................. H04N 5/2352 348/149 |
| 2015/0229630 A1 | 8/2015 | Smith |
| 2015/0317368 A1 | 11/2015 | Rhoads et al. |
| 2015/0332424 A1 | 11/2015 | Kane et al. |
| 2015/0358549 A1 | 12/2015 | Cho et al. |
| 2016/0042767 A1 | 2/2016 | Araya et al. |
| 2016/0104508 A1 | 4/2016 | Chee et al. |
| 2016/0127695 A1 | 5/2016 | Zhang et al. |
| 2016/0165192 A1 | 6/2016 | Saatchi et al. |
| 2016/0358393 A1* | 12/2016 | Penland ............... G08B 15/00 |
| 2016/0364621 A1 | 12/2016 | Hill et al. |
| 2017/0070659 A1 | 3/2017 | Kievsky et al. |
| 2017/0161382 A1* | 6/2017 | Ouimet ................. G06F 16/78 |
| 2017/0178475 A1* | 6/2017 | Renkis .................. H04W 4/70 |
| 2017/0195635 A1 | 7/2017 | Yokomitsu et al. |
| 2017/0230605 A1 | 8/2017 | Han et al. |
| 2017/0237950 A1 | 8/2017 | Araya et al. |
| 2017/0244884 A1 | 8/2017 | Burtey et al. |
| 2017/0277700 A1 | 9/2017 | Davis et al. |
| 2017/0287523 A1 | 10/2017 | Hodulik et al. |
| 2018/0023910 A1 | 1/2018 | Kramer |
| 2018/0050800 A1 | 2/2018 | Boykin et al. |
| 2018/0053394 A1* | 2/2018 | Gersten ................. G08B 25/10 |

FOREIGN PATENT DOCUMENTS

| | | | |
|---|---|---|---|
| EP | 3073449 A1 * | 9/2016 | ............. H04N 5/765 |
| GB | 2273624 | 6/1994 | |
| GB | 2320389 | 5/1998 | |
| GB | 2343252 | 5/2000 | |
| GB | 2351055 | 12/2000 | |
| GB | 2417151 | 2/2006 | |
| GB | 2425427 | 10/2006 | |
| GB | 2455885 | 7/2009 | |
| GB | 2485804 A | 5/2012 | |
| IE | 20090923 A1 | 9/2010 | |
| JP | 294188 | 9/1993 | |
| JP | 153298 | 6/1996 | |
| JP | 198858 | 7/1997 | |
| JP | 10076880 A | 3/1998 | |
| JP | 210395 | 7/1998 | |
| JP | 2000137263 A | 5/2000 | |
| JP | 2005119631 A | 5/2005 | |
| KR | 20-0236817 | 8/2001 | |
| KR | 1050897 | 7/2011 | |
| RU | 2383915 C2 | 3/2010 | |
| RU | 107851 U1 | 8/2011 | |
| RU | 124780 U1 | 2/2013 | |
| WO | 9005076 | 5/1990 | |
| WO | 9738526 | 10/1997 | |
| WO | 9831146 | 7/1998 | |
| WO | 9948308 | 9/1999 | |
| WO | 0039556 | 7/2000 | |
| WO | 0051360 | 8/2000 | |
| WO | 0123214 A1 | 4/2001 | |
| WO | 0249881 | 6/2002 | |
| WO | 02095757 | 11/2002 | |
| WO | 03049446 | 6/2003 | |
| WO | 2004026926 A2 | 4/2004 | |
| WO | 2009013526 A1 | 1/2009 | |
| WO | 2011001180 A1 | 1/2011 | |
| WO | 2012037139 A2 | 3/2012 | |
| WO | 2012120083 A1 | 9/2012 | |
| WO | 2014000161 A1 | 1/2014 | |
| WO | 2014052898 A1 | 4/2014 | |

OTHER PUBLICATIONS

Car Rear View Camera—Multimedia Rear View Mirror—4' LCD color monitor, Retrieved from the Internet: <URL: http://web.archive.org/web/20050209014751/http://laipac.com/multimedia-rear-mirror.htm>, Feb. 9, 2005.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
"Breathalyzer." Wikipedia. Printed Date: Oct. 16, 2014; Date Page Last Modified: Sep. 14, 2014; <http://en.wikipedia.org/wiki/Breathalyzer>.
Dees, Tim; Taser Axon Flex: The next generation of body camera; <http://www.policeone.com/police-products/body-cameras/articles/527231- 0-TASER-Axon-Flex-The-next-generation-of-body-camera/>, Date Posted: Mar. 12, 2012; Date Printed: Oct. 27, 2015.
Brown, TP-LINK TL-WDR3500 Wireless N600 Router Review, Mar. 6, 2013.
Controller Area Network (CAN) Overview, National Instruments White Paper, Aug. 1, 2014.
Daskam, Samuel W., Law Enforcement Armed Robbery Alarm System Utilizing Recorded Voice Addresses Via Police Radio Channels, Source: Univ. of Ky, Off of Res and Eng., Sery (UKY BU107), pp. 18-22, 1975.

(56) References Cited

OTHER PUBLICATIONS

*Digital Ally* vs. *Taser International, Inc.*, Case No. 2:16-cv-232 (CJM/TJ); US D. Kan, Defendant Taser International Inc.'s Preliminary Invalidity Contentions, Jul. 5, 2016.
Electronic Times Article, published Feb. 24, 2005.
Supplementary European Search Report dated Sep. 28, 2010 in European Patent Application No. 06803645.8; Applicant: Digital Ally, Inc.
W. Fincham, Data Recorders for Accident Investigation, Monitoring of Driver and Vehicle Performance (Digest No. 1997/122), Publication Date: Apr. 10, 1997, pp. 6/1-6/3.
Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.
Freudenrich, Craig, Ph.D.; "How Breathalyzers Work—Why Test?." HowStuff Works. Printed Date: Oct. 16, 2014; Posted Date: Unknown; <http://electronics.howstuffworks.com/gadgets/automotive/breathalyzer1.htm>.
Hankyung Auto News Article, Know-How Bank's Black Box for Cars "Multi-Black Box," Copyright 2005.
Guide to Bluetooth Security: Recommendations of the National Institute of Standards and Technology, National Institute of Standards and Technology, U.S. Dep't of Commerce, NIST Special Publication 800-121, Revision 1 (Jun. 2012).
ICOP Extreme Wireless Mic, Operation Supplement, Copyright 2008.
ICOP Model 20/20-W Specifications; Enhanced Digital In-Car Video and Audio recording Systems, date: Unknown.
ICOP Mobile DVRS; ICOP Model 20/20-W & ICOP 20120 Vision, date: Unknown.
Bertomen, Lindsey J., PoliceOne.com News; "Product Review: ICOP Model 20/20-W," May 19, 2009.
ICOP Raytheon JPS communications, Raytheon Model 20/20-W, Raytheon 20/20 Vision Digital In-Car Video Systems, date: Unknown.
Overview of the IEEE 802.15.4 standards for Low rate Wireless Personal Area Networks, 2010 7th International Symposium on Wireless Communication Systems (ISWCS), Copyright 2010.
Lewis, S.R., Future System Specifications for Traffic Enforcement Equipment, S.R. 1 Source: IEE Colloquium (Digest), N 252, Publication Date: Nov. 18, 1996, pp. 8/1-8/2.
Kopin Corporation; Home Page; Printed Date: Oct. 16, 2014; Posted Date: Unknown; <http://www.kopin.com>.
Translation of Korean Patent No. 10-1050897, published Jul. 20, 2011.
Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p-1271.html>, Mar. 4, 2005.
Motor Magazine Article, Recreating the Scene of an Accident, published 2005.
Renstrom, Joell; "Tiny 3D Projectors Allow You To Transmit Holograms From A Cell Phone." Giant Freakin Robot. Printed Date: Oct. 16, 2014; Posted Date: Jun. 13, 2014; <http://www.giantfreakinrobot.com/sci/coming-3d-projectors-transmit-holograms-cell-phone.html>.
Request for Comment 1323 of the Internet Engineering Task Force, TCP Extensions for High Performance, Date: May 1992.
RevealMedia RS3-SX high definition video recorder, http://www.revealmedia.com/buy-t166/cameras/rs3-sx.aspx, Sep. 26, 2013, Date Posted: Unknown, pp. 1-2.
Scorpion Micro DV Video Audio Recorder, http://www.leacorp.com/scorpion-micro-dv-video-audio-recorder/, Sep. 26, 2013, Date Posted: Unknown, pp. 1-3.
"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.
State of Utah Invitation to Bid State Cooperative Contract; Vendor: ICOP Digital, Inc., Contract No. MA503, Jul. 1, 2008.

Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
X26 Taser, Date Unknown.
Taser International; Taser X26 Specification Sheet, 2003.
Digital Ally First Vu Mountable Digital Camera Video Recorder, http://www.opticsplanet.com/digital-ally-first-vu-mountable-digital-camera-video-recorder.html?gclid=CIKohcX05rkCFSIo7AodU0IA0g&ef_id=UjCGEAAAAWGEjrQF:20130925155534:s, Sep. 25, 2013, Date Posted: Unknown, pp. 1-4.
Drift X170, http://driftinnovation.com/support/firmware-update/x170/, Sep. 26, 2013, Date Posted: Unknown, p. 1.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
European Patent Application 15850436.6 Search Report dated May 4, 2018.
Final Written Decision for Inter Partes Review No. 2017-00375, *Axon Enterprise Inc. v. Digital Ally, Inc.*, issued Jun. 1, 2018.
Petition for Post Grant Review No. PGR2018-00052, *Axon Enterprise, Inc. v. Digital Ally, Inc.*, filed Mar. 19, 2018.
MPEG-4 Coding of Moving Pictures and Audio ISO/IEC JTC1/SC29/WG11 N4668 dated Mar. 2002.
Invalidity Chart for International Publication No. WO2014/000161 Oct. 31, 2017 (Resubmitted).
Ecplaza HY-001HD law enforcement DVR, http://fireeye.en.ecplaza.net/law-enforcement-dvr--238185-1619696.html, Sep. 26, 2013, Date Posted: Unknown, pp. 1-3.
Edesix VideoBadge, http://www.edesix.com/edesix-products, Sep. 26, 2013, Date Posted: Unknown, pp. 1-3.
GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.
Isaw Advance Hull HD EXtreme, www.isawcam.co.kr, Sep. 26, 2013, Date Posted: Unknown, p. 1.
Kustom Signals VieVu, http://www.kustomsignals.com/index.php/mvideo/vievu, Sep. 26, 2013, Date Posted: Unknown, pp. 1-4.
LEA-AID SCORPION Micro Recorder Patrol kit,http://www.leacorp.com/products/SCORPION-Micro-Recorder-Patrol-kit.html, Sep. 26, 2013, Date Posted: Unknown, pp. 1-2.
Looxcie Wearable & mountable streaming video cams, http://www.looxcie.com/overview?gclid=CPbDyv6piq8CFWeFQADdlhXC-w, Sep. 26, 2013, Date Posted: Unknown, pp. 1-4.
Midland XTC HD Video Camera, http://midlandradio.com/Company/xtc100-signup, Sep. 26, 2013, Date Posted: Unknown, pp. 1-3.
Panasonic Handheld AVCCAM HD Recorder/Player, http://www.panasonic.com/business/provideo/ag-hmr10.asp, Sep. 26, 2013, Date Posted: Unknown, pp. 1-2.
Notification of Transmittal of the International Search Report and the Written Opinion of the International Search Authority, or the Declaration dated Jan. 30, 2014, International Application No. PCT/US2013/062415; International Filing date Sep. 27, 2013, Applicant: Digital Ally, Inc.
Point of View Cameras Military & Police, http://pointofviewcameras.com/military-police, Sep. 26, 2013, Date Posted: Unknown, pp. 1-2.
POV.HD System Digital Video Camera, http://www.vio-pov.com/index.php, Sep. 26, 2013, Date Posted: Unknown, pp. 1-3.
Invalidity Chart for International Publication No. WO2014/000161 Oct. 31, 2017.
PCT Patent Application PCT/US17/16383 International Search Report and Written Opinion dated May 4, 2017.
SIV Security in Vehicle Driving Partner, http://www.siv.co.kr/, Sep. 26, 2013, Date Posted: Unknown, p. 1.
Spy Chest Mini Spy Camera / Self Contained Mini camcorder / Audio & Video Recorder, http://www.spytechs.com/spy_cameras/mini-spy-camera.htm, Sep. 26, 2013, Date Posted: Unknown, pp. 1-3.
Stalker VUE Law Enforcement Grade Body Worn Video Camera/Recorder, http://www.stalkerradar.com/law_vue.shtml, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.

(56) References Cited

OTHER PUBLICATIONS

TASER AXON Body On Officer Video/Police Body Camera, http://www.taser.com/products/on-officer-video/axon-body-on-officer-video, Sep. 23, 2013, Date Posted: Unknown, pp. 1-8.
TASER AXON Flex On-Officer Video/Police Video Camera, http://www.taser.com/products/on-officer-video/taser-axon, Sep. 26, 2013, Date Posted: Unknown, pp. 1-8.
Taser Cam Law Enforcement Audio/Video Recorder (gun mounted), http://www.taser.com/products/on-officer-video/taser-cam, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
uCorder Pockito Wearable Mini Pocket Camcorder, http://www.ucorder.com/, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
Veho MUVI portable wireless speaker with dock, http://veho-uk.fastnet.co.uk/main/shop.aspx?category=camcorder, Sep. 26, 2013, Date Posted: Unknown, p. 1.
Vidmic Officer Worn Video & Radio Accessories, http://www.vidmic.com/, Sep. 26, 2013, Date Posted: Unknown, p. 1.
VIEVU Products, http://www.vievu.com/vievu-products/vievu-squared/, Sep. 25, 2013, Date Posted: Unknown, pp. 1-2.
WatchGuard CopVu Wearable Video Camera System, http://watchguardvideo.com/copvu/overview, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
WolfCom 3rd Eye, X1 A/V Recorder for Police and Military, http://wolfcomusa.com/Products/Products.html, Sep. 26, 2013, Date Posted: Unknown, pp. 1-3.
Notification of Transmittal of the International Search Report and the Written Opinion of the International Search Authority, or the Declaration dated Jan. 14, 2016, International Application No. PCT/US2015/056039; International Filing date Oct. 16, 2015, Applicant: Digital Ally, Inc.
U.S. Appl. No. 13/959,142 Final Office Action dated Jul. 20, 2016.
U.S. Appl. No. 13/959,142 Office Action dated Nov. 3, 2015.
*Digital Ally, Inc.* vs. *Taser International, Inc.*, Case No. 2:16-cv-020232 (CJM/TJ); US D. Kan, Complaint For Patent Infringement, Jan. 14, 2016.
*Digital Ally, Inc.* vs. *Enforcement video LLC d/b/a Watchguard Video.*, Case No. 2:16-cv-02349 (CJM/TJ); US D. Kan, Complaint For Patent Infringement, May 27, 2016.

International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2016.
Petition for Inter Partes Review No. 2017-00376, *Taser International, Inc.* v. *Digital Ally, Inc.*, filed Dec. 1, 2016.
Petition for Inter Partes Review No. 2017-00515, *Taser International, Inc.* v. *Digital Ally Inc.*, filed Jan. 11, 2017.
Petition for Inter Partes Review No. 2017-00775, *Taser International, Inc.* v. *Digital Ally Inc.*, filed Jan. 25, 2017.
PCT Patent Application PCT/US16/34345 International Search Report and Written Opinion dated Dec. 29, 2016.
State of Utah Invitation to Bid State Cooperative Contract; Vendor: Kustom Signals Inc., Contract No. MA1991, Apr. 25, 2008.
U.S. Appl. No. 15/011,132 Office Action dated Apr. 18, 2016, 19 pages.
Zepcam Wearable Video Technology, http://www.zepcam.com/product.aspx, Sep. 26, 2013, Date Posted: Unknown, pp. 1-2.
New Rearview-Mirror-Based Camera Display Takes the Guesswork Out of Backing Up Retrieved from the Internet: <URL: htttb://news.thomasnet.com/fullstory/497750>, Press Release, Oct. 30, 2006.
SIIF Award for Multi Black Box, published Dec. 10, 2004.
Near Field Communication; Sony Corporation; pp. 1-7, Date: Unknown.
Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.
Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.
Amazon.com wearable camcorders, http://www.amazon.com/s/ref=nb_sb_ss_i_0_4?url=search-alias%3Dphoto&field-keywords=wearable+camcorder&x=0&y=0&sprefix=wear, Sep. 26, 2013, Date Posted: Unknown, pp. 1-4.
Notification of Transmittal of the International Search Report and the Written Opinion of the International Searching Authority, or the Declaration dated Feb. 4, 2016; International Application No. PCT/US2015/056052; International Filing Date: Oct. 16, 2015; Applicant: Digital Ally, Inc.
http://www.k-h-b.com/board/board.php?board=products01&comand=body&no=1, Current State of Technology Held by the Company, Copyright 2005.
City of Pomona Request for Proposals for Mobile Video Recording System For Police Vehicles, dated prior to Apr. 4, 2013.
http://www.k-h-b.com/sub1_02.html, Copyright 2005.

* cited by examiner

SYSTEM FOR AUTOMATICALLY TRIGGERING A RECORDING

RELATED APPLICATIONS

This non-provisional patent application claims priority benefit, with regard to all common subject matter, of earlier-filed U.S. Provisional Patent Application No. 62/469,241 filed Mar. 9, 2017 and entitled AUTOMATIC VIDEO TRIGGERING SYSTEM. The identified earlier-filed provisional patent application is hereby incorporated by reference in its entirety into the present application.

BACKGROUND

1. Field

Embodiments of the invention are broadly related to automatic triggering of sensors. More specifically, embodiments of the invention are directed to the automatic collection of data from sensors triggered by the sensors or other devices to record events of interest.

2. Related Art

Cameras are becoming widespread for documenting events of interest. For example, dashboard cameras may be triggered to record when an accident occurs so that a driver has a record of the event. Pre-event recording may be used to create a record of the events immediately preceding the triggering accident. Similarly, law-enforcement officers may wear body-mounted cameras to record law-enforcement events from a first-person point of view. However, the triggers for automatically recording traffic accident or law-enforcement events are not generally suitable for other, commercial applications. As such, camera systems that can be triggered to record by a wide variety of conditions are needed.

SUMMARY

Embodiments of the invention address the above-described need by providing for a system that may automatically trigger recording of an event, store the event recording with relevant information, and may perform an action in response to the triggering event.

In particular, in a first embodiment, the invention includes a system for automatically recording an event, comprising a first sensor configured to collect a first set of data, a second sensor configured to collect a second set of data, a recording device manager, comprising, a data store, a processor, one or more non-transitory computer-readable media storing computer-executable instructions, that, when executed by the processor, perform the steps of receiving the first set of data from the first sensor, detecting a triggering event from the first set of data, transmitting, in response to the detection of the triggering event, a signal from the recording device manager to the second sensor, wherein the signal instructs the second sensor to begin collecting the second set of data, storing, in a data store, the first set of data collected at the first sensor, storing, in the data store, the second set of data collected at the second sensor, and storing a third set of data in the data store, wherein the third set of data is not collected at the first sensor or at the second sensor.

In a second embodiment, the invention includes a method of automatically recording an event, comprising the steps of collecting a first set of data at a first sensor, detecting a triggering event from the first set of data at a recording device manager, sending a first signal, in response to the detection of the triggering event, from the recording device manager to the second sensor, wherein the first signal instructs a second sensor to begin collecting a second set of data, sending a second signal, in response to the detection of the triggering event, from the recording device manager to an electromechanical device, wherein the electromechanical device performs an action in response to the third signal, and storing the first set of data collected at the first sensor and the second set of data collected at the second sensor.

In a third embodiment, the invention includes one or more non-transitory computer storage media storing computer-executable instructions that, when executed by a processor, perform a method of automatically recording an event, the method comprising the steps of collecting a first set of data at a first sensor, detecting a triggering event from the first set of data at a recording device manager, sending a first signal from the recording device manager to a second sensor instructing the second sensor to collect a second set of data, sending a second signal from the recording device manager to an electromechanical device, instructing the electromechanical device performs an action responsive to the second signal, and storing the first set of data and the second set of data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
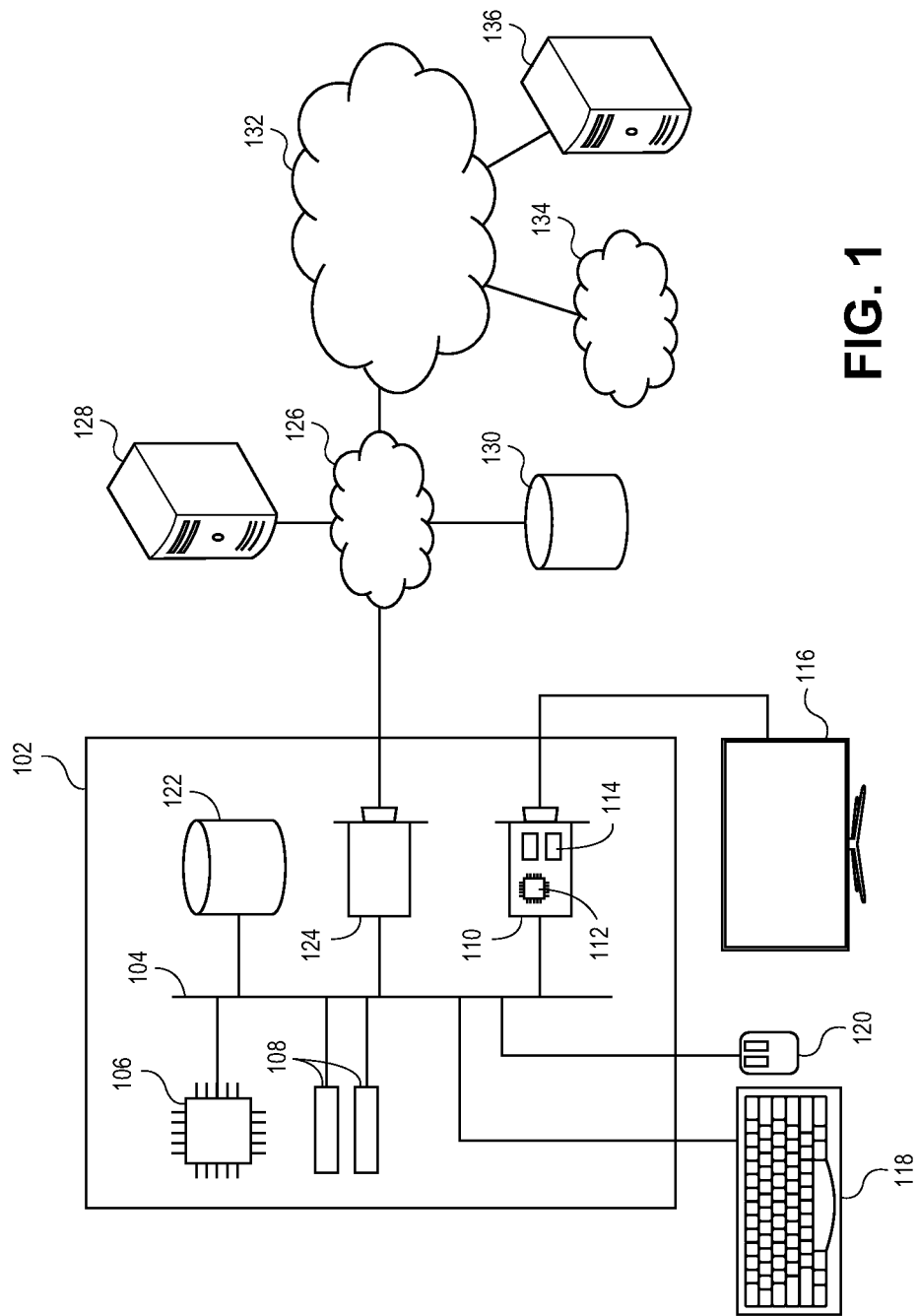
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above problems by providing a system and method for more versatile triggering of video recordings appropriate to a wider range of applications. Broadly, the video triggering system includes one or more sensors and a recording device manager. One or more of the sensors may be an image sensor such as a camera. When an event of interest occurs, it is captured by the sensors and the recording device manager may trigger other sensors such as a camera to begin recording the event. Where multiple sensors are positioned to record the event, the triggered sensors may communicate to the recording device manager to cause all other sensors to record as well. For example, a camera may be the sensor that triggers other sensors based on a triggering event captured by the camera.

In one embodiment, an event is detected and a signal is sent to a camera to begin recording. These may also be referred to as a "triggering event" and a "triggering signal." The camera may be communicatively coupled to a recording device manager and one or more mobile devices or computers. The sensor may send a signal directly to one or more cameras or to the recording device manager. The recording device manager may send one or more signals to a plurality of cameras or other sensors to begin recording. The camera may begin recording the video when the signal is received. The recording is terminated as determined by a predetermined set of instructions, when the user turns off the camera or when a separate event is sensed that, according to predetermined rules executed by the camera or the video recording manager, signals the camera to end the video recording.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a recording device manager, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also, connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In certain embodiments, computer 102 can itself be directly connected to Internet 132.

Exemplary Embodiments of the Invention

Figure 2:
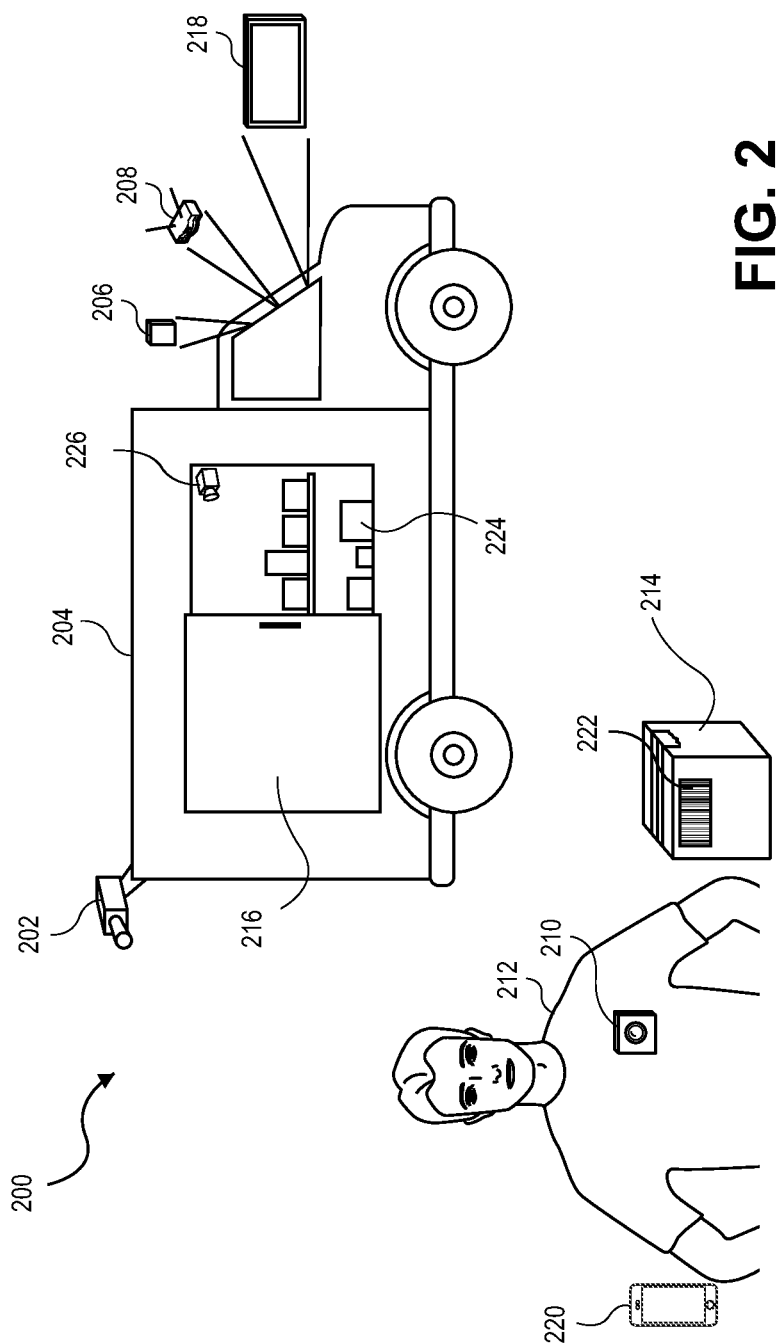
FIG. 2 depicts a parcel delivery scenario in certain embodiments of the invention.

In the following embodiment, as depicted in FIG. 2, triggering events are exemplified in the field of parcel delivery. In the depicted embodiment, a camera 202 may be mounted on a delivery vehicle 204. For example, delivery vehicle 204 may be a vehicle used in a commercial parcel delivery service, an armored vehicle, a food delivery vehicle, or any vehicle used for delivery of goods or services. Alternatively, camera 202 may be handheld, mounted in a fixed location (such as on a wall or desk), mounted to a mobile object (such as a bicycle, a car, a plane, or other vehicle), or an autonomously mobile vehicle and may operate autonomously. Camera 202 may be mounted on the delivery vehicle 204 to provide a wide area view of the destination. The camera 202 may be standalone or attached to a person or animal. In various embodiments of the invention, camera 202 may record video in the camera memory or to an external memory, or broadcast the video to a remote location for storage and/or real time monitoring. The recording may also be monitored at the location of the recording. In certain embodiments, camera 202 may include the capability for pre-event and/or post-event recording. In general, in pre-event recording, cameras continuously record imagery into a buffer. When recording is triggered, the contents of the buffer (representing imagery from a period of time such as 30 second or one minute prior to the trigger signal) are also stored. In this way, the events leading up to the triggering signal are also recorded. Similarly, for post-event recording, a camera may continue recording for a short period after a trigger signal to stop recording is received. For example, if the trigger signal to stop recording the interior of a garage is a vehicle breaking an infra-red beam at the exit, post-event recording may continue recording for 30 seconds to ensure the vehicle completed the process of exiting the garage safely.

In some embodiments, the time, location, personal identification of people, numbers associated with people or animals, and other information about the event that may be sensed by either analog or digital sensors and recorded in digital form may be recorded as metadata. This data may be received from any of the sensors mentioned above, from RFID tags, or from computers or mobile devices communicatively connected to the triggering system and may be received from a recording device manager and not directly from the sensors. The real-time information transmitted by any of the devices can be embedded in the video data. This data may be used at a later date for verification purposes. For example, in a court case it may be persuasive to have the data embedded on the video recording, in real time, rather than just stored in a folder that may be or may not have to be manipulated between the time of recording and presentation. This may also be used for statistical, performance, or productivity purposes. For example, data may be extracted from a video recording of a day of delivering parcels from a parcel delivery service. With the time record, the number of parcels, and the driver ID transmitted from an RFID, the driver's performance that day may be evaluated against other drivers.

In the exemplary embodiment of the invention depicted in FIG. 2, the triggering event may be the arrival of delivery vehicle 204 at a particular location. A video record of the parcel delivery can be captured. As such, sensor 206 for initiating the triggering signal may be a GPS receiver. Camera 202 may be triggered to record, and/or stop recording, based on a plurality of conditions. These conditions may be based on any type of input. In other embodiments, sensor 206 may be any type of sensor and there may be a plurality of sensors. For example, the sensor 206 may include accelerometers, gyroscopes, strain gauges, proximity sensors, chemical sensors, motion sensors, pressure sensors, light sensors, image sensors, or any other analog or digital sensor. The visual sensors may detect in multiple spectra including visual, radio, radar, infrared, x-ray, gamma ray, or ultraviolet, as necessary. Sensors may be used alone or in combination. Broadly, any type of sensor 206 is contemplated for use with embodiments of the invention. In this example, the destination GPS coordinates are known. When the vehicle 204 is within proximity to the destination GPS coordinates, sensor 206 may send a triggering signal to camera 202 to begin recording. Alternatively, sensor 206 could transmit to the recording device manager 208 continuously and recording device manager 208 could send trigger signals when coordinates match a predetermined area. When camera 202 begins recording, it may also send a communications signal to recording device manager 208 indicating that it is recording or has been instructed to record. Alternatively, the signal from sensor 206 may be sent directly to the recording device manager 208 and the recording device manager 208 may signal the camera 202 to begin recording.

In certain embodiments, camera 202 may send the video signal to a data store or to the recording device manager 208. The recording device manager 208 may relay the video signal to the data store. The recording device manager 208 may embed additional data in the video signal such as date, time, RFID number, or any other data that may be useful in some embodiments of the invention. The additional data may be stored as metadata.

As shown, a secondary, body-mounted camera 210 may be attached to a parcel service employee 212 in order to provide a secondary recording. As with camera 202, camera 210 may be mounted in any fashion, and may record in any visual spectrum. Parcel service employee 212 may drive the delivery vehicle 204, be a person designated to deliver parcels, or both drive and deliver. When camera 202 signals recording device manager 208 that recording is in process, recording device manager 208 may signal the secondary camera 210 to begin recording. Alternatively, camera 202 may signal camera 210 directly. The recording device manager 208 may receive the signal from the GPS sensor 206 for location and the recording device manager 208 may determine that the delivery vehicle 204 is proximate the delivery location. When the predefined proximity has been reached the recording device manager 208 may send a signal to all sensors to start recording. The information from the sensors may be tagged with information such as location, time, parcel 214 information such as tracking number, weight, size, contents, and employee 212 information such as number, employee rank, history, and any other information associated with the parcel 214 or employee 212. An RFID tag may be attached to the employee 212, the parcel 214, or both, and information such as the current location, time, employee ID number, parcel number and information may be stored as metadata on the video recording. Additionally, the information may not be received from the sensors and may be received from a clock, or self-contained device independently tracking information such as date and time, and may also be received from an online database, website, or mobile application.

Alternatively, recording device manager 208 may be incorporated into any of the sensors including one of camera 202 or camera 212, or into both. Camera 212 may also be triggered independently to begin recording (in which case it may or may not trigger camera 202 to begin recording). For example, a triggering event for camera 212 may be activated by motion detection of the parcel service employee 212 exiting delivery vehicle 204, opening the service door 216, or tripping an infrared laser (not shown) at the exit of the vehicle 204. In certain embodiments, manual activation of camera 212 may also serve as a triggering event.

In some embodiments, camera 202 and/or camera 212 may be connected to a monitor 218 for real-time viewing of the destination to ensure a safe environment prior to delivery. The monitor 218 may be in the interior of the delivery vehicle 204, on a communicatively coupled mobile device 220, or in a remote location. In some embodiments of the invention, when camera 202 or 212 is triggered to begin recording, recording device manager 208 may send a notification to mobile device 220, notifying the user that an event of interest has occurred. The recording device manager 208 may also send the signal to start recording to all sensors simultaneously or individually. The employee 212 can then remotely monitor the feeds from one or more cameras 202 or 212. In some such embodiments, the employee 212 may also be able to activate or deactivate cameras 202 and 212, recording device manager 208, monitor 218, or any online data that may be uploaded by the recording device manager 208 or any sensors from the mobile device 220 as well.

As another application of embodiments of the invention in the same context, the body-mounted camera 210 may be activated when the parcel bar code 222 is scanned on parcel 214. The bar code 222 may be scanned with the mobile device 220 that may be a phone or a scanning device issued by the parcel delivery service. A signal may be transmitted from the mobile device 220 to the recording device manager 208 and the recording device manager 208 may signal the other sensors to activate.

In an exemplary application of the embodiment depicted in FIG. 2, the information for all parcels 224 on board the delivery vehicle 204 can be recorded at each stop if the parcel 214 is lost or delivered to the wrong address. Thus, information related to the location and time the parcels exited the vehicle 204 can be retrieved. As such, if a parcel service employee 212 is not able to find the parcel 214, the employee 212 may search the recorded metadata and locate the last time the RFID for the parcel 214 was recorded in the delivery vehicle 204. By accessing the video from body-mounted camera 210 at that stop, the employee 208 can verify that the parcel 214 was mistakenly removed from the vehicle 204 at that point and recover the missing parcel 214.

Alternatively, the recorded video and associated metadata may be uploaded to an online website, computer, or mobile application. When a parcel 214 has been delivered to an incorrect address, or a customer cannot find the parcel 214 that has been delivered, the customer may go online to view the information associated with the delivery and/or access parts, or all, of the associated metadata. The customer can then determine if the parcel 214 has been delivered to the correct address and where the parcel 214 may be located. Similarly, when the recording is triggered for a customer's package, a notification may be sent to a mobile device or an account of the customer. The customer may then view the parcel delivery in real-time.

The customer account may also be set up to the customer's home security system. When a notification is sent to the customer account the customer security system may be notified and automatically send an alert to the customer or automatically begin recording the delivery event. The customer may receive notification and view the delivery via a mobile application or computer.

In another exemplary scenario depicted in FIG. 2, embodiments of the invention may be used in the field of securing objects. A camera 226 may be installed in the interior of the delivery vehicle 204 to track the parcels 224. The parcels 224 may be held in a cage (not shown) or behind the service door 216. When the cage, or service door 216, is unlocked, or opened, the camera 226 may be triggered to record. The video and associated data may be used to ensure safe practices and that protocol is properly followed. The camera 226 may be oriented in a way that records the employee 212 accessing the locked cage, or service door 216. The employee 212 accessing the secured parcels 224 may have an RFID tag. The time, location, RFID number along with other relevant information may be stored as metadata on the video recording. Additional cameras, such as the body-mounted camera 210 mounted on the employee 212 or cameras providing a wide-angle view of the surroundings such as camera 202 may also be triggered to begin recording by the recording device manager 208 as described above. Embodiments of the invention may be applied to any cage, door, vault, display case, lock box, or any other method of securing valuables such as electronics, firearms, jewelry, liquor, medicines, or animals at a zoo and these may be opened closed or actuated using any sort of electromechanical device that may be activated from an electric signal. These are exemplary embodiments and do not limit the field to parcel deliveries. This example may also apply to autonomous delivery of said items where the vehicle may be autonomous with a delivery person or the entire delivery system autonomous. Triggering events may be coupled to autonomous settings of a vehicle. The initiation of an autonomous state may also be a triggering event.

Figure 3:
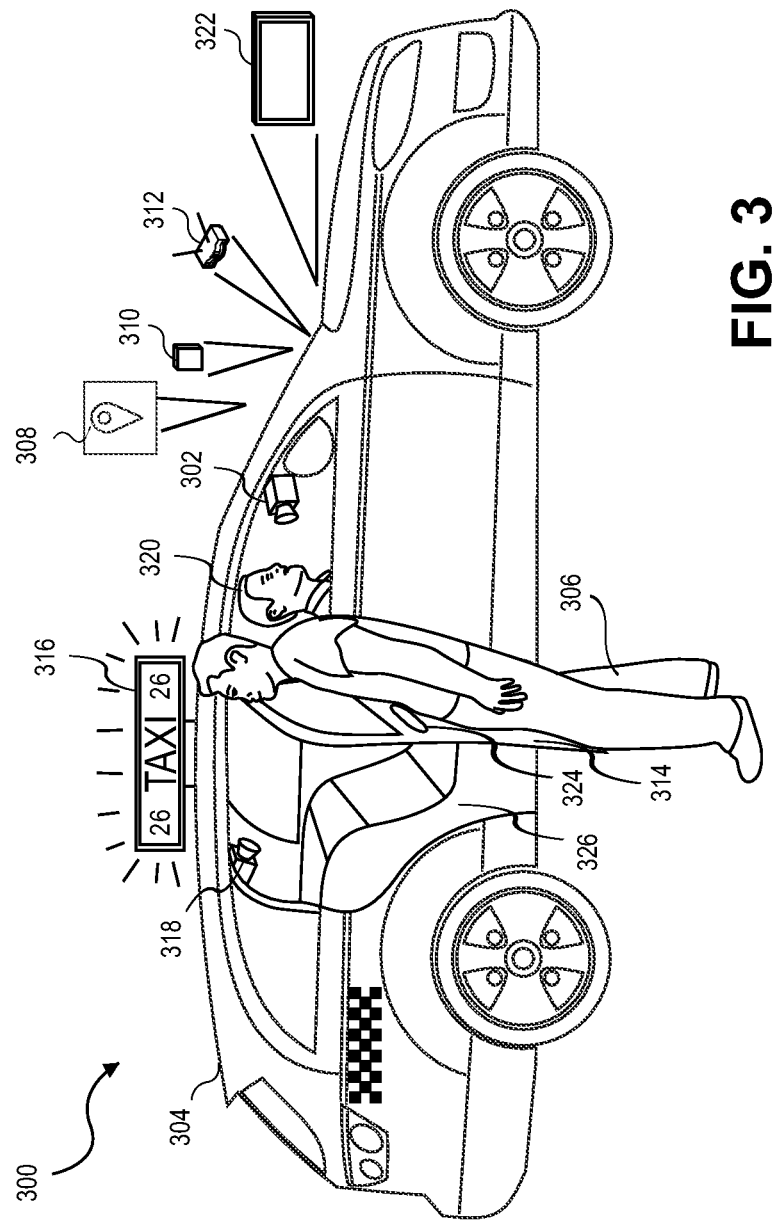
FIG. 3 depicts an exemplary embodiment depicting a taxicab ride related to embodiments of the invention.

The system may be beneficial not only for the transportation of goods but also for the transportation of people. In another exemplary scenario depicted in FIG. 3, embodiments of the invention may be used in the field of passenger transportation. A camera 302 may be installed in the interior of a passenger vehicle. The passenger vehicle may be a taxicab 304 as depicted or may be a ride-sharing vehicle, a bus, or any other vehicle transporting passengers. The passenger 306 may be a person, animal, or an object as described above. The taxicab 304 may have a GPS sensor 308 and when the GPS sensor 308 is within proximity of the pick-up area GPS coordinates, the camera 302 may be triggered to activate. The triggering event may be sensed by any general sensor 310 and the triggering signal transmitted from the general sensor 310 directly to other sensors such as the camera 302 or to a recording device manager 312 and the recording device manager 312 may send signals to other sensors to active. The camera 302 may also be triggered to activate when a door 314 to the taxicab 304 is opened, when a passenger 306 enters the taxicab 304, or when a destination is input into a navigation device (not shown). For example, the trigger may be the activated by a rooftop indicator 316. When the indicator 316 signals vacant or off-duty operation, the camera 302 is not recording. Subsequently a camera 318 pointed toward the outside of the taxicab 304 may be triggered to record when the indicator 316 is signaling that the taxicab 304 is in a vacant operation state and the taxicab 304 has pulled to the side of the road in a specific motion to pick up a passenger 306.

A driver 320 may view the video footage from the camera 302 and the camera 318 on a monitor 322. The video may also be viewed remotely or via a mobile application. The driver 320 may also view payment information via the monitor 322 provided by sensors that may be activated during payment of a fare. For example, the passenger 306 may swipe a card to pay for a ride and a screen may be displayed to the driver 320 requesting input from the driver 320. The camera 302 may also be activated upon receipt of a payment attempt or in the event that the passenger 306 signs an electronic signature device. The passenger 306 may fail to pay or may not have funds in which the system may actuate locks to trap the passenger 306 or allow the passenger to leave. The system may also alert authorities and signal a visual emergency alert such as a flashing light or an audible noise alerting anyone near that the passenger has not paid. This may also be useful in the event that the passenger 306 has a weapon or is conducting any illegal actives in the taxicab 304.

The system initiating the signal may be based in part on the state of the taxicab 304 and not necessarily on the actions of the driver 320 or the passenger 306. In this case, the system may be operationally independent of the driver 320.

As such, the system may be fully operational with the driver 320 or autonomously. In some embodiments, the driver 320 may initiate a signal that triggers the system or any remote signal may be used to operate the taxicab 304 that initiates the system. The initiation of the mode of the taxicab 304 may be a triggering event. For example, the passenger 306 may hail the taxicab 304 with voice and a movement. The autonomous taxicab 304 may access a database of voice and motion cues that exemplify a hailed ride activity. The system matches the gestures with the stored cues and determines that the passenger 306 needs a ride. Upon this determination, the system activates the necessary sensors and begins recording. Alternatively, the triggering event may be specific GPS coordinates that are communicatively relayed from the sensor 310, navigation system, or mobile device. The triggering event may be motion detected, such as when the passenger 306 reaches for the door handle 324, or when the passenger 306 enters the taxicab 304. The triggering event may be pressure-related, such as when the passenger 306 sits down on the seat 326.

Figure 4:
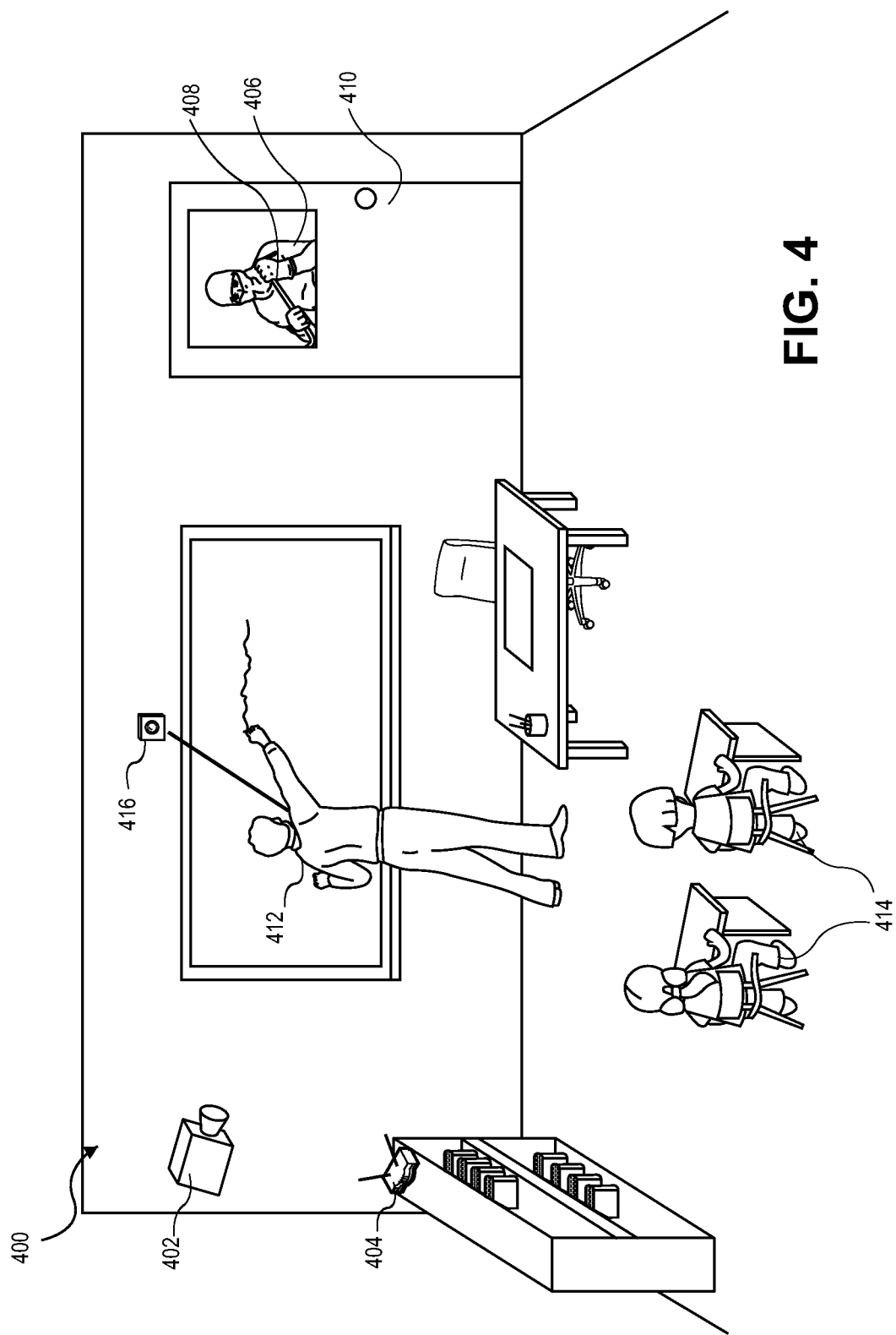
FIG. 4 depicts an exemplary embodiment depicting a school classroom.

Embodiments of the invention may be suitable for a typical school. FIG. 4 depicts an exemplary embodiment of a classroom 400. A camera 402 may be mounted in the classroom 400, hallway, cafeteria, in any room in the interior, and on the exterior of the school. The camera 402 may be connected to a recording device manager 404 or other sensors as described above. The system may run facial or object recognition software. The software may recognize that a suspicious person 406 is a known criminal or is carrying a weapon 408 such as a knife or a firearm. The software may also recognize that the suspicious person 406 is approaching the classroom 400 or a school with concealed hands such as in a pocket or hidden in a bag or coat. This may be a low-level triggering event that causes sensors to track the suspicious person 406 until it can be determined that the suspicious person 406 is not armed. Upon detection of the suspicious person 406 the software may send a signal to an electromechanical device such as an electronic locking mechanism on the door 410. The door 410 may be automatically locked preventing the suspicious person 406 from entering the classroom 400. The system may also be in communication with local first responders such as fire department, law enforcement, medical personnel, or any other agency or group of people that may need notification or could be helpful in the event of an emergency. The system may also alert people in other parts of the school, signaling for evacuation or that help is needed and provide a location based on the location of the generation of the triggering event.

In some embodiments, the camera 402 may be on the exterior of the school such that in the event that suspicious person 406 approaches the school the system automatically locks the exterior doors that the suspicious person 406 is attempting to enter. In some embodiments, the system may lock all exterior doors. In the event that the suspicious person 406 is inside the building all doors, windows, or any other possible escape routes may be locked thus trapping the suspicious person 406 in a particular room or section of the school. This may be done to cut the suspicious person 406 off from any other people and trap the suspicious person 406 until authorities arrive.

In some embodiments as depicted in FIG. 4, the door 410 may be locked and the system may unlock the door 410 when it is determined that the suspicious person 406 is not a threat. For example, the system may access a database of images that correspond to teachers, students, parents, or any known people that have granted access to the school. The system may recognize that the suspicious person 406 and create a log that the suspicious person 406 has entered the building and the classroom 400. The system may keep a log of all people in the building and at any point an unrecognized person is detected the system restricts the unrecognized person from passing into a different section of the building and alerts security as to the location of the unrecognized person.

In some embodiments, the suspicious person 406 may be a student, teacher, parent, or any other person that may have been granted access to the facility (in this case a school). The suspicious person 406 may be carrying a weapon 408 such as a firearm or knife. The system may use object recognition software to recognize that the suspicious person 406 is carrying a weapon 408 and though the suspicious person 406 may register as an approved person for entry, the suspicious person 406 may be locked out and denied entry based on the object recognition. The system may employ any of the above-mentioned features for detaining, trapping, or preventing the suspicious person 406 from movement throughout the building.

Continuing with exemplary embodiments depicted in FIG. 4, in the exemplary field of schools; teachers, coaches, staff, and administrators may be outfitted with a body-mounted video camera 416 that easily attach to a clothing article worn by the wearer. Then, as the teacher 412 (or other wearer) interacts with students 414 throughout the day, the body-mounted camera 416 silently and inconspicuously records the events. The camera 402 may also be in the room as to have a wider view of the space. In the event of a crime, or dispute, the camera 402 or body mounted camera 416 may be triggered to begin. This may occur through motion activation, such as, an object flying across the room, a fist being thrown, or any other motion that may be related to an event that breaks school policy. These triggering events may begin the recording from the camera 402 or the body mounted camera 416 may begin recording through a signal from the camera 402 or the recording device manager 404. The recording session may be monitored by other people such as a principal remotely via a computer, tablet, or other mobile device. An RFID tag may be worn by the teacher 412 and all events and information, such as location, time, and RFID tag information may be recorded as metadata on the video recording. The data imaged by the camera 402 and the body worn camera 416 may be transmitted and stored remotely to ensure that the suspicious person 406 or a disruptive student does not have access to the stored data. The data may be stored in a cage that may be run by the system as described above. The data may be stored with embedded information such as the RFID, time, date, trigger event, and information related to people that are tracked in the school such as teachers, parents, students, and staff.

Embodiments of the invention may be advantageous for capturing events related to the school that take place that are not necessarily on the school premises, such as field trips, playgrounds, athletic facilities, and other events outside of school buildings. In some embodiments, a body-mounted camera may access and utilize a smartphone to transfer data while outside of communication range of a recording device manager. Embodiments of the invention may also be useful for providing oversight of the teachers without a significant administrative burden. This would allow administrators or even concerned parents to review a brief, random clip of video data. For example, a ten-minute clip during classroom discussion may be uploaded daily or upon request.

The exemplary embodiment above may apply to any commercial or government building. For example, sensors may be attached to the exterior or interior of a building. The sensors may receive data indicative of a person or object such as transmitted numbers, names, or any other data that may be transmitted over radio frequency, infrared or any other method. The sensors may also be cameras that employ facial or object recognition software as described above. The sensors may track individuals or objects. As the individuals or objects move throughout or around the building, the system may track the movements via the sensors. The sensors may be RFID readers, retinal scans, fingerprint readers, push button pads, biometric information, or any other way that information may be digitized. Any one of the sensor inputs may be a triggering event for other sensors including the cameras.

Figure 5:
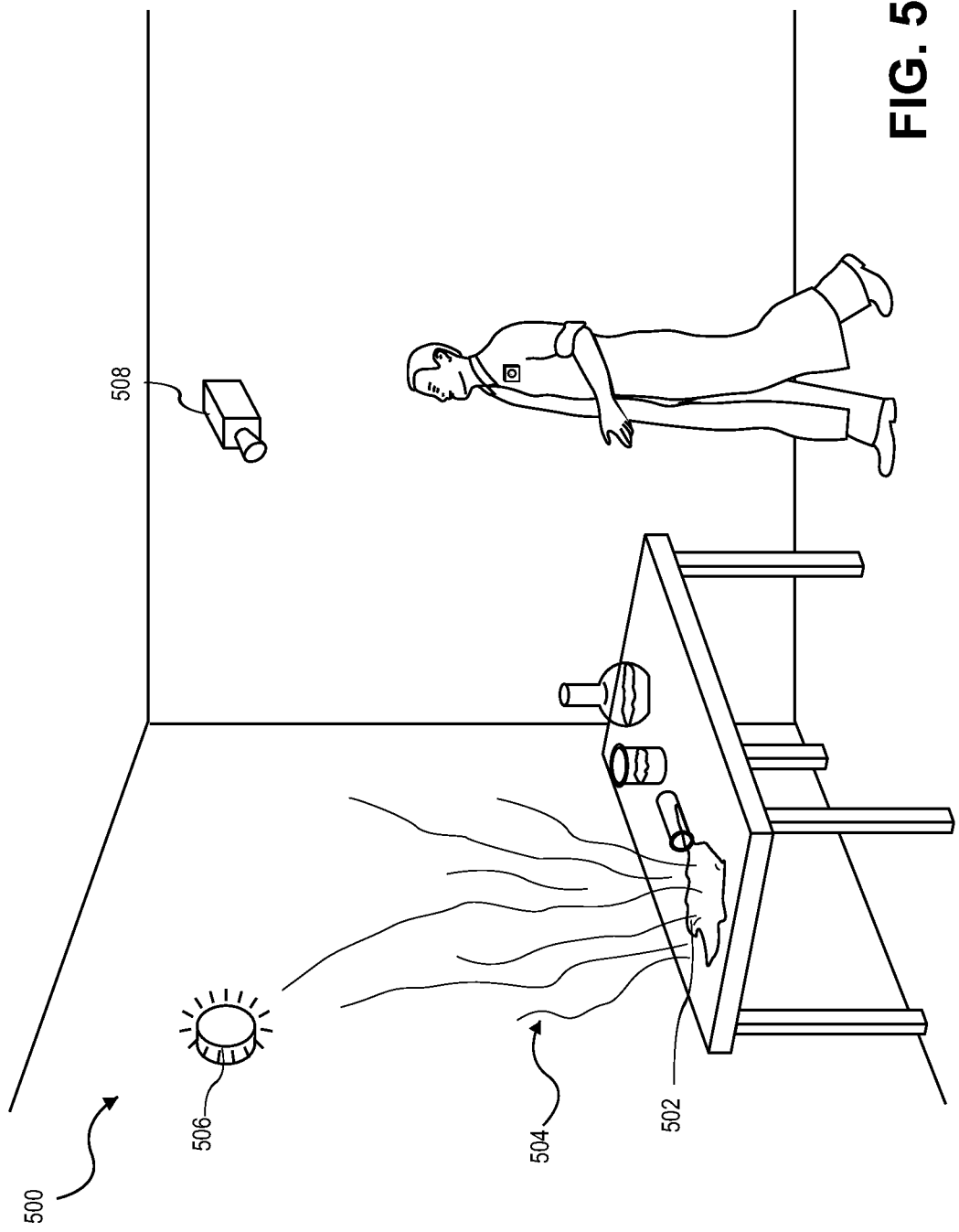
FIG. 5 depicts an exemplary embodiment depicting a laboratory.

An exemplary embodiment depicted in FIG. 5 presents a laboratory 500. In the laboratory, a liquid has been spilled. The spilled liquid 502 may give off a gas 504 that when detected by a sensor in this case a gas detector 506 activates a camera 508. The gas detector signal 506 may be directly sent to the camera 508 for activation or the signal may be sent through a recording device manager as described above. The sensors or the recording device manager may send multiple signals to multiple devices and/or sensors. For example, the system may compare the gas 504 sensed to a database of toxic gases and determine that the gas 504 is not toxic and send no signals. It may be determined that the gas 504 is toxic and the system may send signals alerting authorities, signaling evacuation procedures, locking, automatically spraying the room with a neutralizing spray, quarantining the room, and any other such activity that may be achieved through sending a signal to an electronic device such as a processor, a sensor, and a switch.

Once the gas 504 is detected the event that lead to the gas 504 exposure has already occurred. In this case, it may be beneficial to utilize pre-event recording. The triggering event may be gas detection and a signal may be sent to the camera 508 to activate. The camera 508 may begin sending information to a remote data store and the 30, 60, 120 seconds, 10 minutes, 0.5 hours, or any other predefined time range prior to the triggering event may be transmitted to the data store. This allows the events leading up to the triggering event to be recorded.

Alternatively, sensors such as the gas detector 506 may be mounted along exposed gas lines and triggered to begin recording when the gas within the line is sensed. Sensors may be mounted in sewer tunnels and triggered to record when toxic gases climb to specified levels. These sensors may be body-mounted sensors on workers inspecting the tunnels and activated along with an alert when toxic gases reach specified levels. Any video or sensor data may be transmitted to a remote monitoring location to ensure the workers safety. This transmission may be by radio frequency, infrared, electrical lines, or any other form of signaled communication depending on availability and necessity. The levels recorded, location, time, employee ID numbers, or any other information associated with any data in some embodiments of the invention may be recorded as metadata associated with video recording and other sensor data.

Additional Exemplary Embodiments of the Invention

As described above, the selective triggering of recording of one or more cameras, sensors, and data stores based on a variety of sensors can provide great benefits. However, each application for the embodiment may require a different configuration of sensors, cameras, and metadata. As such, a variety of exemplary scenarios is disclosed herein to describe the variety of triggering signals and applications that can be used with the invention.

In one exemplary scenario, a camera may be attached to a service vehicle, such as a tow truck. The location of a distressed vehicle is known. When the camera is within proximity, defined by GPS coordinates, the video recorder is triggered to begin. A body-mounted camera may also be attached to the employee that is triggered to begin when in proximity of the destination as determined by GPS or geofencing, or the body-mounted camera may receive a signal from the other camera, or the recording device manager triggering the recording. The tow company employee may initiate a triggering event so the camera begins recording and the camera or recording device manager may send a signal to other cameras to begin recording. Information may be stored as metadata on the video recording such as GPS coordinates, time, date, employee identification number. The employee may also wear an RFID tag and the customer may fill out information electronically. The employee identification and the customer information may be stored as metadata on the video recording. This may be used to ensure safety of the employee and the customer and that proper procedures are followed. The recording may also be helpful in the event of property damage during the tow event. The tow truck may operate autonomously and the initiation of this state, or other autonomous states, may be triggering events.

In a second exemplary scenario, embodiments of the invention may be used in the industrial field. A camera may be installed on a type of industrial machine such as a lathe, a press, or other industrial machines. The camera may be triggered to record when the machine is in a specific state, such as on, running, off, or standby. A plurality of cameras may be in communication. A triggering event may cause a camera to begin recording and that camera may send a signal to start other cameras. The signal may also be sent from a recording device manager. The industrial machines may be autonomous and the initiation of the autonomous state may be a triggering event.

In another embodiment of the invention in the industrial or construction field, a sensor may be installed on a construction or industrial vehicle such as a forklift. Alternatively, the industrial vehicle may be a dump truck, a bull dozer, a loader, a scraper, a crane, or any other machine used in construction or industry. The sensor may be a camera and may be triggered to begin recording when the forklift ignition is turned to the on position. The camera may be triggered by an accelerometer sending a signal to a device manager in turn the device manager sending a signal to the camera to begin recording when the forklift moves in a direction, or comes to a stop.

The triggering event may be accident related. For example, the camera may turn on due to a motion detection sensor sensing motion. A triggering event may be the detection of objects falling, relative motion between two objects in close proximity, or objects moving at or above a specified speed. The triggering event may be a collision. In this case, the camera may employ pre- and post-recording options. The camera may be connected to a monitor such that the machine operator has better visibility surrounding the industrial vehicle. The camera may be mounted at a stationary position in a warehouse and triggered by a motion sensor when machines come into frame. The stationary camera may be triggered by the camera onboard the forklift. The stationary camera may be used to monitor progress, procedure, or safety. Any data associated with the data collected by the cameras such as date, time, employee identification number may be stored as metadata on the video recording. The camera may be triggered by autonomous initiation. The initiation of this state may be a triggering event. In some embodiments of the invention, a camera may be installed in a construction zone to monitor traffic while connected to a monitor in a construction vehicle. This may signal and monitor traffic in and out of the construction zone letting the machine operator know when it is safe to operate the machinery.

In a fourth exemplary scenario, embodiments of the invention may be used for identification of a person. A camera may be at a location where a client or customer's identification is required, such as using a credit card or a bank transaction. When the client or customer swipes a credit card through a magnetic card reader or signs a digitizer the video recorder is triggered to begin. A camera may be trigger directly from the user input sensor from the recording device manager. The card and digitizer identification may be used immediately along with facial recognition software to determine the person's identity. The camera may be triggered by the facial recognition software when a person's identification is either known or not known. If the person's identity is known then no identification is required. If the person's identity is unknown the identification is required. In either case the identification is stored in metadata in the video recording. Upon repeat visits a customer's identity is known through the facial recognition software. This may also be used in multi-level verification for identity. The customers previously entered information may be stored as metadata on the video recording and accessible to the employee. This data may be downloaded, making the interaction more efficient.

In a fifth exemplary scenario, embodiments of the invention may be used in connection with computers. A camera may be triggered to record when a computer is accessed. The camera may be triggered by opening the computer, starting the computer, or logging on. The video may keep a record of the user and time of use. Upon determination of criminal activity, the video may be referenced for prosecution. It may also be used for productivity and for tracking time of use for a public computer system. The user may store personal information on the computer that may be accessed at a later date. For example, if a book is not available at a public library, a customer may scan their library card and enter the book information while their identity is recorded by facial recognition software and stored as metadata on the video recording. Upon the next visit, the facial recognition software recognizes the customer, initiates a triggering event that begins a new recording session under the previously obtained user information, and retrieves the information from the previous session. Without any input from the customer, the customer is alerted that the book is now available.

In a sixth exemplary scenario, embodiments of the invention may be used in a medical context. The video recording may be triggered by an RFID tag associated with a medical practitioner or patient. In an exemplary embodiment, the camera may be a body-mounted camera worn by doctors, nurses or other medical or hospital administrative personnel or staff. The RFID tag may be worn by the patient, attached to the patient's bed, or in the patient's room. When the body-mounted camera comes into proximity with the RFID tag, video recording is triggered to begin, and the medical personnel's interactions with the patients can be recorded. The recording may help provide concrete and credible evidence in medical malpractice cases. As such, the doctor may be able to prove what information was given to the patient, what responses were given by the patient, etc. This may provide a video record of the interactions between doctor and patient. Any information such as medication or patient information, statistics, and vitals may be recorded on the video and may be embedded as metadata.

In yet another exemplary scenario, embodiments of the invention may be used in signaling an emergency. A triggering event may be a pressing of Code Blue button on medical equipment. Upon the triggering of the Code Blue, the recording device manager may instruct all body-mounted video cameras on the floor or in the room to begin recording. As another example, a defibrillator being taken out of a holster may trigger the body-mounted video camera or any other sensors to begin. Yet another example, an eye- or hand-washing washing station within the hospital may be equipped with a sensor. The sensor may automatically trigger a recording and may tag which camera is being used. The RFID tags may be placed throughout the hospital to track locations of the doctors so that a record of what doctor was interacting with a patient can be better recorded. Locations, actions, and medical information may all be tracked by a recording device manager and stored as metadata on the video recordings.

An Exemplary Method in Accordance with the Invention

Figure 6:
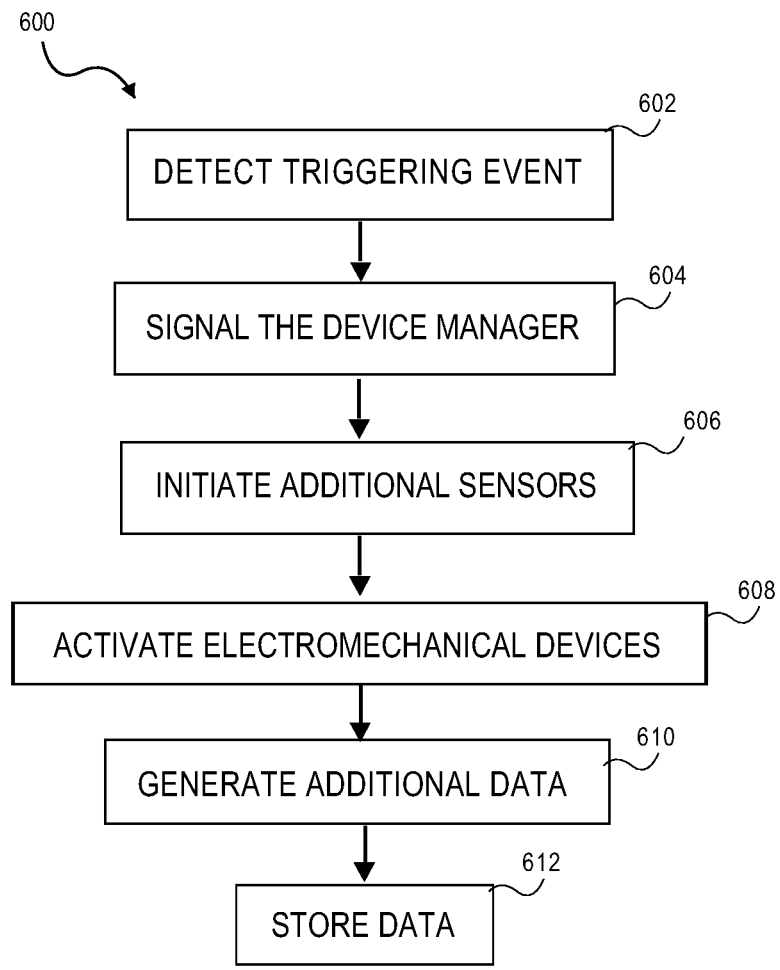
FIG. 6 depicts a flowchart illustrating the operation of a method in accordance with embodiments of the invention.

FIG. 6 presents a flow chart 600 representing an exemplary method that may be used in some embodiments of the invention. In a first step 602, a first sensor may detect a triggering event, or transmit to the recording device manager allowing the recording device manager to detect the triggering event. The first sensor may be configured to sense pressure, light, force, stress, strain, electromagnetism, voltage, current, temperature, or any other factor that may be useful in signaling an event that may be recorded. The first sensor may continually monitor events such that when a triggering event occurs a signal indicating that the triggering event has occurred may be transmitted. For example, a camera may detect that a person has a weapon and is approaching a school. The signal from the camera is sent to a recording device manager where it is processed.

Moving now to step 604, the first sensor may generate a first signal to send to a recording device manager. The recording device manager may be standalone or located on, or in, one of the sensors. The recording device manager may contain a data store, a processor, and memory, and may signal other sensors to activate and may signal an external data store to store data from the sensors. Continuing with the example from step 602 where a signal was sent from the camera to the recording device manager, upon receipt of the signal from the camera the images are put through object recognition software and it is determined that the person is carrying a weapon.

In step 606, in some embodiments the recording device manager may signal other sensors to activate. A second signal may be generated at the recording device manager and transmitted to the other sensors. In the event that there is no recording device manager or that no delay is acceptable the second signal may be sent from the triggering sensor or the second signal may be the first signal and sent directly to the recording device manager and all other sensors. Continuing with the example from above, once it is determined that a triggering event has occurred a signal may be sent from the device manager to an electromechanical locking mechanism.

In step 608, electromechanical devices may be activated. The electromechanical devices may actuate physical objects to achieve a purpose in response to the triggering event. Continuing the example above, the electromechanical switch receives the signal from the recording device manager and locks the door. In some embodiments, examples of electromechanical devices may include actuators, switches, motors, or any other mechanical device that may be operated in response to or by an electrical signal.

In step 610, additional sensor information may be stored with any information that may be generated or sensed from the electromechanical devices or the result of the activities of the electromechanical devices. Continuing the example from above, a sensor may be utilized to verify that the electromechanical switch locked the door. The sensor may detect that the door is locked and send a signal to the recording device manager.

In step 612, the system may then store all data. All data may be stored from any sensors. The system may store data generated at the first sensor, other sensors, and alternative data. Alternative data may be stored as metadata. Initiation of the data store may be made from the first or second signals. Pre-recording for any sensors may also be implemented. Any recording or pre-recording may take place at the data store or at the device that is sensing. Continuing the example from above, the electromechanical device may be locked and the sensor has sent verification of the locked door to the device manager. A triggering event is detected and the lock actuates locking a door. Information that the door was locked and sensed to be locked at 3:00 pm may be stored. The information may be stored as metadata with the video data from the camera or stored with any data from the sensors.

In some embodiments of the invention, the steps of the flow chart 600 may be interchanged deleted or steps may be added. Any actions described within a step may be deleted or added to a different step. For example, in embodiments the recording device manager may not be necessary to send signals between sensors. The step of storing may begin before or concurrently with sending the first signal or at any step of the process. A first sensor such as a camera with a processor may send a signal to all other sensors and the data store to begin recording the data without the need for an intervening recording device manager. In some embodiments, the peripheral sensors may also contain processors that may calculate or process other information such as from online databases that may be included in the stored data. Any sensor may send a signal to any electromechanical device and activate the mechanical device.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for automatically recording an event, comprising:
   a sensor configured to collect a set of sensor data,
   wherein the set of sensor data is indicative of at least one of pressure, force, stress, strain, time, temperature, speed, acceleration, location, magnetism, voltage, and current;
   a video camera configured to collect a set of video data;
   a recording device manager, comprising:
      a data store;
      a processor; and
      one or more non-transitory computer-readable media storing computer-executable instructions, that, when executed by the processor, perform the steps of:
      receiving the set of sensor data from the sensor;
      detecting a triggering event from the set of sensor data;
      determining, by the processor, that the triggering event is a low-level triggering event;
      transmitting wirelessly, in response to the detection of the triggering event, a signal from the recording device manager to the video camera,
      wherein the signal instructs the video camera to begin collecting the set of video data to tack the triggering event;
      performing at least one of object recognition and facial recognition on the video data to determine a threat level of the triggering event;
      storing, in a set of metadata data, the set of sensor data collected at the sensor;
      determining, by the processor, that the triggering event is a threat;
      storing information indicative of the at least one object recognition and facial recognition to the set of metadata data based on the determination that the triggering event is a threat;
      embedding the set of metadata data in the video data at the recording device manager; and
      storing, in the data store, the set of video data including the embedded set of metadata data.

2. The system of claim 1,
   wherein the video camera is configured to be attached to a person, and
   wherein the set of video data is sent wirelessly from the video camera to the recording device manager.

3. The system of claim 2, wherein the set of metadata data is indicative of at least one of a time, a date, the triggering event, a location, and a personal identification.

4. The system of claim 3, wherein the set of metadata data and the set of sensor data are stored as metadata associated with the set of video data.

5. The system of claim 1, wherein the first set of video data collected at the first video camera includes the triggering signal.

6. The system of claim 1, wherein the recording device manager is integrated into the sensor.

7. A method of automatically recording an event, comprising the steps of:
collecting a set of sensor data at a sensor,
wherein the set of sensor data is indicative of at least one of pressure, force, stress, strain, time, temperature, speed, acceleration, location, magnetism, voltage, and current;
detecting a triggering event from the set of sensor data at a recording device manager,
determining, by the processor, that the triggering event is a low-level triggering event;
sending a first signal, in response to the detection of the triggering event, from the recording device manager to a video camera,
wherein the first signal instructs the video camera to begin collecting a set of video data;
performing at least one of object recognition and facial recognition on the set of video data;
determining, by the processor, that the triggering event is a threat;
sending a second signal, in response to a result of the at least one object recognition and facial recognition, from the recording device manager to an electromechanical device,
wherein the electromechanical device performs an action in response to the second signal; and
storing the set of sensor data collected at the sensor as metadata with the set of video data collected at the video camera based on the determination that the triggering event is a threat;
embedding information indicative of the at least one object recognition and facial recognition to the metadata,
wherein the metadata is embedded in the video data at the recording device manager prior to storing.

8. The method of claim 7, wherein the electromechanical device is at least one of an actuator, a lock, and a motor.

9. The method of claim 7, wherein the triggering event is at least one of recognition of a temperature above a specified threshold, a collision, recognition of a speed above a specified threshold, and recognition of an acceleration above a specified threshold.

10. The method of claim 7, wherein the recording device manager is integrated into the sensor.

11. The method of claim 7, wherein the recording device manager is configured to transmit and receive the set of sensor data and the set of video data wirelessly.

12. One or more non-transitory computer storage media storing computer-executable instructions that, when executed by a processor, perform a method of automatically recording an event, the method comprising the steps of:
collecting a set of sensor data at a sensor,
wherein the set of sensor data is indicative of at least one of pressure, force, stress, strain, time, temperature, speed, acceleration, location, magnetism, voltage, and current;
detecting a triggering event from the set of sensor data at a recording device manager,
determining, by the processor, that the triggering event is a low-level triggering event;
sending a first signal from the recording device manager to a video camera instructing the video camera to collect a set of video data based on the low-level triggering event;
analyzing the video data to determine if a person associated with the low-level triggering event is a threat;
sending a second signal, based on the analysis of the video data, from the recording device manager to an electromechanical device, instructing the electromechanical device to perform an action responsive to the second signal based on the determination that the person is a threat;
storing the set of sensor data as metadata with the set of video data, and
embedding information indicative of the identity of the at least one person in the video data with the set of metadata,
wherein the metadata is embedded in the video data at the recording device manager prior to storing.

13. The media of claim 12, wherein the triggering event is a recognized movement matching a stored movement in a database.

14. The media of claim 12, wherein the method further comprises the step of: generating a set of response data in response to and indicative of the action performed by the electromechanical device.

15. The media of claim 12, wherein the sensor is a magnetic card reader and the video camera is configured to record a transaction performed via the magnetic card reader.

16. The media of claim 15, wherein the action performed by the electromechanical device is at least one of actuating a lock, initiating an alarm, and initiating a visual signal, or initiating an audible signal.

* * * * *